(12) United States Patent
Sinelli et al.

(10) Patent No.: US 12,228,263 B1
(45) Date of Patent: Feb. 18, 2025

(54) LIGHT MODULE FOR AN EXTERIOR MIRROR

(71) Applicant: Motherson Innovations Company Limited, London (GB)

(72) Inventors: Gary Sinelli, Birmingham, MI (US); Donald DePalma, Armada, MI (US); Alan Fraley, Marine City, MI (US); Anthony P. D'Andrea, Attica, MI (US)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 18/584,153

(22) Filed: Feb. 22, 2024

(51) Int. Cl.
| | | |
|---|---|---|
| *F21S 43/20* | (2018.01) | |
| *F21S 43/14* | (2018.01) | |
| *F21S 43/237* | (2018.01) | |
| *F21S 43/31* | (2018.01) | |
| *F21W 103/15* | (2018.01) | |
| *F21W 103/25* | (2018.01) | |

(52) U.S. Cl.
CPC ............... *F21S 43/26* (2018.01); *F21S 43/14* (2018.01); *F21S 43/237* (2018.01); *F21S 43/31* (2018.01); *F21W 2103/15* (2018.01); *F21W 2103/25* (2018.01)

(58) Field of Classification Search
CPC .......... F21S 43/26; F21S 43/14; F21S 43/237; F21S 43/31; F21W 2103/15; F21W 2103/25

See application file for complete search history.

(56) References Cited

U.S. PATENT DOCUMENTS

| | | | | |
|---|---|---|---|---|
| 6,769,798 | B2 * | 8/2004 | Mishimagi | B60Q 1/2665 362/548 |
| 2006/0146555 | A1 * | 7/2006 | Inaba | F21S 43/239 340/475 |
| 2010/0091508 | A1 * | 4/2010 | Fukasawa | B60Q 1/2665 362/509 |
| 2018/0154823 | A1 * | 6/2018 | Salter | B60R 1/074 |
| 2019/0248332 | A1 * | 8/2019 | De Wind | B60R 25/209 |
| 2021/0331624 | A1 * | 10/2021 | Gough | B60Q 1/2665 |

* cited by examiner

*Primary Examiner* — Evan P Dzierzynski
(74) *Attorney, Agent, or Firm* — Jones Day

(57) ABSTRACT

The present disclosure refers to a light module for an exterior mirror of a vehicle. The light module includes a housing, a lens attached to the housing and including at least a first lens section that is configured to direct light in a first direction and a second lens section that is configured to direct light in a second direction, a first light module printed circuit board (PCB) mounted within the housing, a first light emitting diode (LED) attached to the first light module PCB, at least one reflector mounted with the housing and configured to reflect light emitted from the first LED through the first lens section, a second LED attached to the first light module PCB, and a light pipe mounted within the housing and configured to receive light emitted from the second LED and emit light through the second lens section.

18 Claims, 6 Drawing Sheets

LIGHT MODULE FOR AN EXTERIOR MIRROR

FIELD

The present disclosure relates generally to a multi-functional light module for a vehicle, in particular for a rearview device of a motor vehicle.

BACKGROUND

The statements in this section provide background information relating to the present disclosure and are not intended to constitute prior art.

Vehicles, such as passenger cars, vans, and trucks, typically include rear view mirror assemblies. These assemblies increasingly include light modules to provide various lighting functions for the vehicle, such as security lights, running lights, puddle lights, turn signal lights, and spotlights. These lighting functions packaged in a single light module are often used for driver notification and for security and safety functions. Packaging multiple lighting functions in a mirror assembly can create difficulty in utilizing a mirror design across different countries with different government regulations relating to the type and color of each light function. In some cases it may be desirable to have the light functions differ across countries. Due to government regulations, light emitting from the mirror assembly may be required to maintain a particular color for all light associated with a given operation. When the operations vary from product line to product line, communizing one light source in a multi-functional light module becomes more challenging. It is desirable to develop a system where the light system may be communized and the light emitted may be modified to meet regulations.

SUMMARY

The present disclosure provides a light module for an exterior mirror of a vehicle, comprising a housing, a lens attached to the housing and including at least a first lens section that is configured to direct light in a first direction and a second lens section that is configured to direct light in a second direction, a first light module printed circuit board (PCB) mounted within the housing, a first light emitting diode (LED) attached to the first light module PCB, at least one reflector mounted with the housing and configured to reflect light emitted from the first LED through the first lens section, a second LED attached to the first light module PCB, and a light pipe mounted within the housing and configured to receive light emitted from the second LED and emit light through the second lens section. In embodiments, the light module may further include a second light module PCB mounted within the housing, and a third LED attached to the second light module PCB, where the at least one reflector is further configured to reflect light emitted from the third LED through the first lens section.

In embodiments, light emitted through the first lens section is directed in a forward-facing direction with respect to a direction of forward movement of the vehicle. For example, the first and third LEDs may be configured to emit light in one or more directions different than the forward-facing direction, and the at least one reflector may be configured to re-direct the light emitted from the first and third LEDs in the forward-facing direction.

In embodiments, light emitted through the first lens section is white light and light emitted through the second lens section is non-white light. For example, the first and second LEDs may be white light emitting LEDs, white light emitted from the second LED may be filtered to the provide non-white light emitted through the second lens section. In embodiments, the light emitted through the second lens section may be amber light, and/or the light emitted through the second lens section may be directed in a side- and/or rear-facing direction with respect to a direction of forward movement of the vehicle, for example to provide a running light and/or turn signal function for the vehicle. In embodiments, light emitted through the second lens section may be in a normally-on state to provide the running light function and may turn off and on to provide the turn signal function for the vehicle.

In embodiments, the light module may include an optical coupler configured to receive light from the second LED and direct light into the light pipe. The optical coupler may, for example, comprise or have an attached an optical filter that filters the spectrum of white light emitted from the second LED to provide non-white light emitted through the second lens section. In embodiments, an optical coupler and/or optical filter may be welded or clipped to the light pipe. In other embodiments, the light pipe may be configured to filter white light emitted to provide non-white light emitted through the second lens section.

An embodiment of the present disclosure provides a light module for an exterior mirror of a vehicle comprising a housing, a lens attached to the housing and including at least a first lens section that is configured to direct light in a forward-facing direction with respect to a direction of forward movement of the vehicle and a second lens section that is configured to direct light in one or more directions different than the forward-facing direction, a first light module printed circuit board (PCB) mounted within the housing, a second light module PCB mounted within the housing, a first light emitting diode (LED) attached to the first light module PCB, a second LED attached to the first light module PCB, a third LED attached to the second light module PCB, a plurality of reflectors mounted within the housing and configured to reflect light emitted from at least the first and third LEDs through the first lens section in the forward-facing direction, and a light pipe mounted within the housing and configured to receive light emitted from the second LED and emit light through the second lens section. In embodiments, the light emitted through the second lens section is directed in a side- and/or rear-facing direction with respect to a direction of forward movement of the vehicle. In further embodiments, the light emitted through the second lens section provides a running light and/or turn signal function for the vehicle.

Another embodiment of the present disclosure provides a light module for an exterior mirror of a vehicle comprising a housing, a lens attached to the housing and including at least a first lens section that is configured to direct white light in a forward-facing direction with respect to a direction of forward movement of the vehicle and a second lens section that is configured to direct non-white light in one or more directions different than the forward-facing direction, a first light module printed circuit board (PCB) mounted within the housing, a first light emitting diode (LED) attached to the first light module PCB, at least one reflector mounted within the housing and configured to reflect light emitted from the first LED through the first lens section, a second LED attached to the first light module PCB, and a light pipe mounted within the housing and configured to receive light emitted from the second LED and emit light through the second lens section. In embodiments, the first and second LEDs are white light emitting LEDs, and wherein white light emitted from the second LED is filtered to the provide the non-white light emitted through the second lens section.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein.

DETAILED DESCRIPTION

Figure 1:
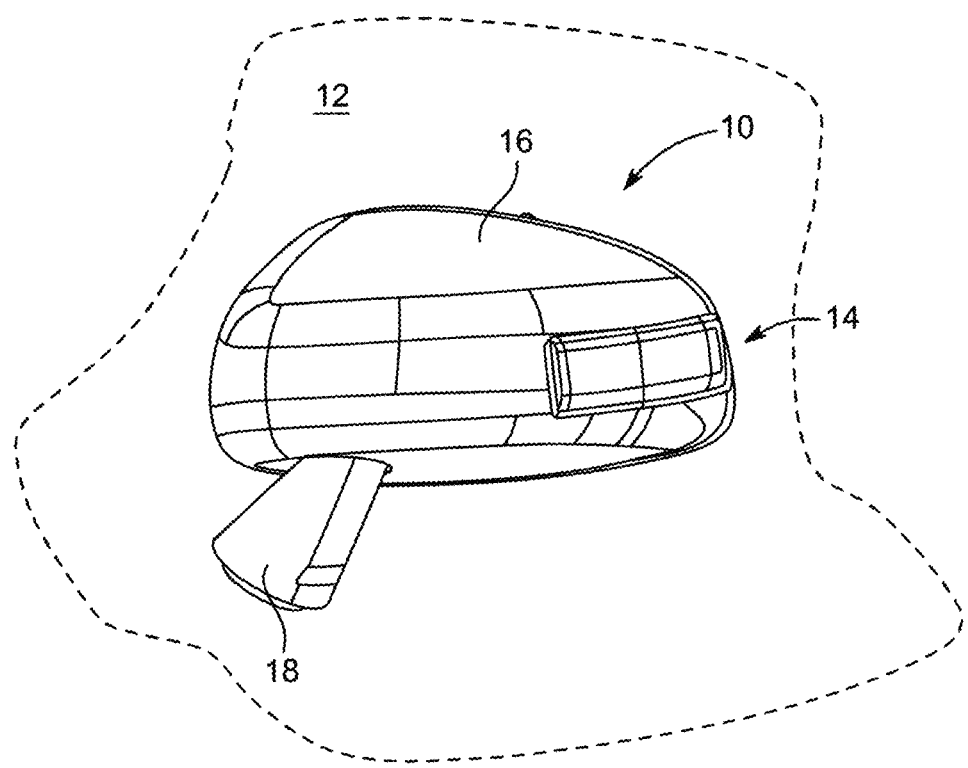
FIG. 1 illustrates an example perspective view of an exterior rearview mirror assembly including a multi-function light module.

The following description is exemplary in nature and is not intended to limit the present disclosure, application, or uses. It should be understood that throughout the drawings, corresponding reference numerals indicate like or corresponding parts and features.

FIG. 1 illustrates an example perspective view of a rearview mirror assembly 10 including a light module 14. The exterior rearview mirror assembly 10 further includes a mirror head 16 and a mirror base 18 and is mounted on a vehicle surface 12. The mirror head 16 is configured to carry at least a reflective element (not shown). In addition, in embodiments the mirror head 16 may carry at least one camera. In an embodiment, the rearview device may be in the form of a camera pod with a camera head carrying at least one camera.

The rearview assembly 10 in FIG. 1 is mounted to an A-pilar, but may be mounted in other locations on a motor vehicle in other embodiments. The rearview mirror assembly 10 may also have other functions, such as power-folding capability, breakaway capability, telescoping capability, and/or other light assemblies mounted on the mirror head 16 or the mirror base 18.

Figure 2:
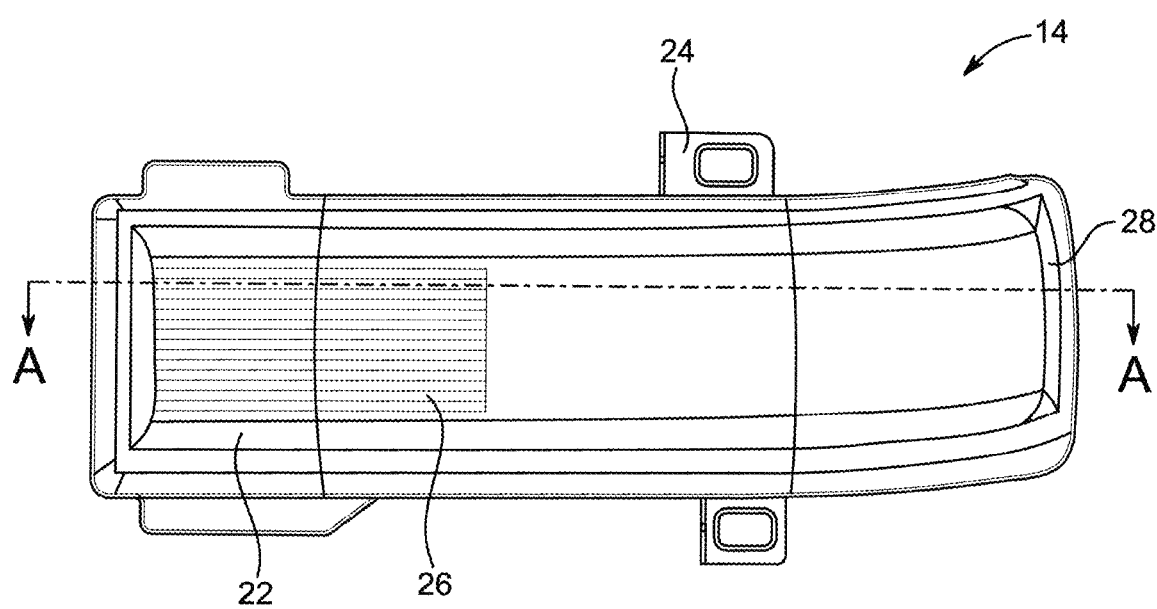
FIG. 2 illustrates a front perspective view of a multi-function light module.

FIG. 2 is a perspective view of the light module 14. The light module 14 has a lens 22 which may contain optics to direct or modify one or more light sources mounted behind the lens 22. A housing 24 is used to mount the components of the light module 14 and provide a mounting arrangement for fastening the light module 14 to the mirror head 16. The lens 22 is connected or joined to the housing 24 (e.g., by welding, adhesive, or other known fastening method) and has an inner surface and an outer surface which provide a viewing surface that is illuminated by the light module 14 in use. The lens 22 may include at least a first lens section 26 that is configured to direct light in a first direction and a second lens section 28 that is configured to direct light in a second direction. The first lens section 26 may, for example, be configured to direct light in a forward-facing direction with respect to a direction of forward movement of the vehicle, for example to provide a forward-facing spotlight for the vehicle. The second lens section 28 may, for example, be configured to direct light in a side- and/or rear-facing direction with respect to a direction of forward movement of the vehicle, for example to provide a running light and/or turn signal function for the vehicle.

Figure 3:
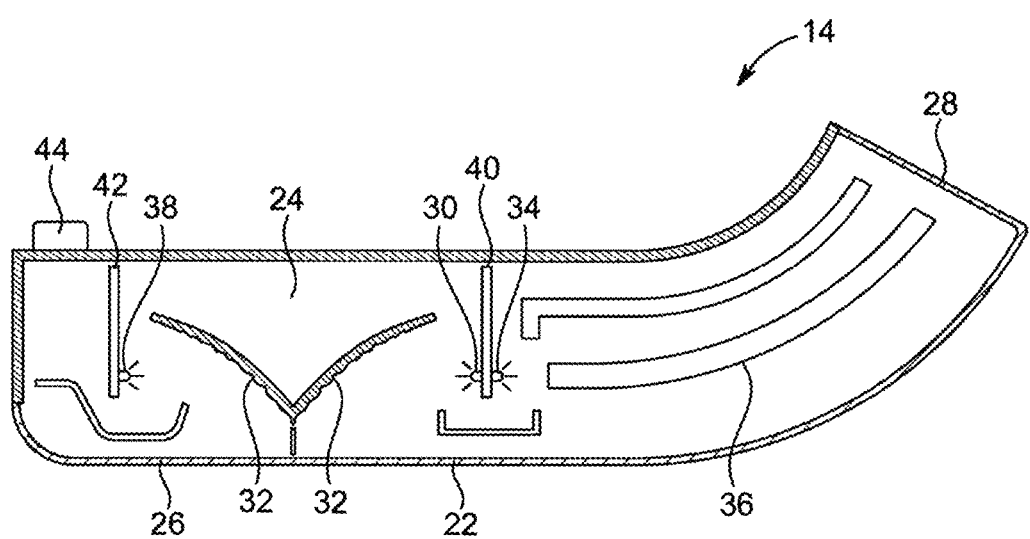
FIG. 3 illustrates a sectional view of the multi-function light module.

FIG. 3 illustrates a sectional view of the light module 14 utilizing the section A-A illustrated in FIG. 2. As shown in FIG. 3, the light module 14 may include a first light module printed circuit board (PCB) 40, a second light module PCB 42, a plurality of reflectors 32, and a light pipe 36 mounted within the housing 24. A first light emitting diode (LED) 30 is attached to a first side of the first light module PCB 40 in a direction facing the reflectors 32, a second LED 34 is attached to a second side of the first light module PCB 40 in a direction facing the light pipe 36, and a third LED 38 is attached to the second light module PCB 42 in a direction facing the reflectors 32. Also attached to the first and second light module PCBs 40, 42 is a connector device 44 for electrically connecting the light module PCBs 40, 42 to a wire harness for the rearview mirror assembly 10.

The reflectors 32 are configured to reflect light emitted from the first and third LEDs 30, 38 through the forward-facing first lens section 26. In this way, the first and third LEDs 30, 38 may provide a forward-facing light function for the light module 14, such as a forward-facing spotlight. In embodiments, one or both of the first and third LEDs may include multiple LEDs to provide a desired forward-facing light intensity. For example, in embodiments, the first and third LEDs 30, 38 may include 2-4 white LEDs having a light intensity that is selected to provide a spotlight function.

The light pipe 36 is configured to receive light emitted from the second LED 34 and emit light through the second lens section 28. The light pipe 36 may, for example, comprise an optic fiber or other mechanism for transporting and emitting light. The light pipe 36 is configured to receive light from the second LED 36 and emit the light in a direction different than the light emitted from the first and third LEDs 30, 38, such as through a side- and/or rear-facing section 26 of the light module lens 22. In this way, the second LED 30 and associated light pipe 36 may be used, for example, to provide a side- and/or rear-facing function for the light module 14, such as a running light and/or turn signal light.

Figure 5:
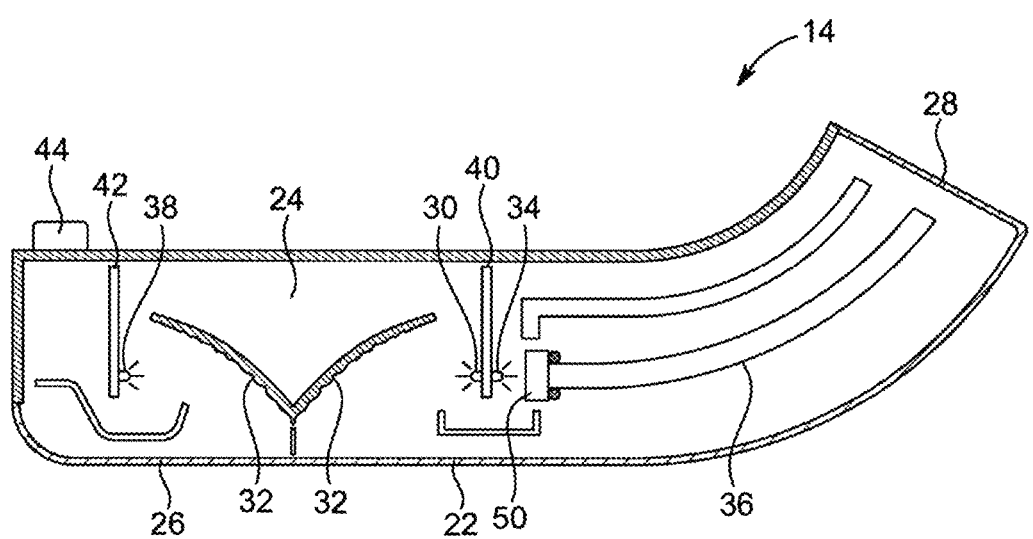
Figure 6:
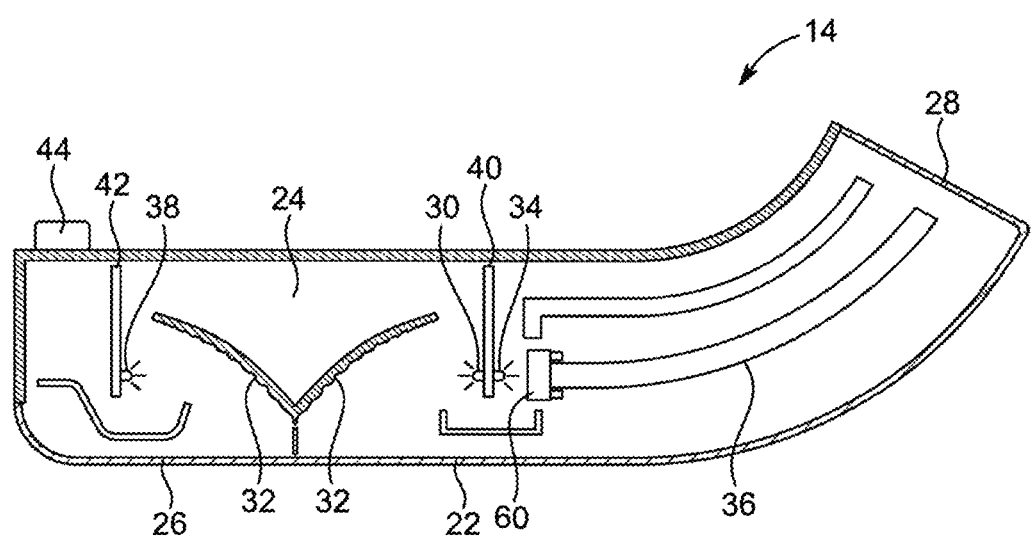

In embodiments, the light emitted through the forward-facing first lens section 26 by the first and third LEDs 34, 38 may be white light, and the light emitted through the side- and/or rear-facing second lens section 28 by the second LED 30 may be non-white light, such as amber light. In an embodiment, the light emitted by the second LED 30 may be filtered to the provide the non-white light (e.g., amber light) emitted through the second lens section 28. In one embodiment, the light pipe 36 may be configured (e.g., colored) to filter white light emitted from the second LED 30 to provide the desired color of non-white light emitted through the second lens section 28. In other embodiments, for example as shown in FIGS. 4-6, an optical filter may be included between the second LED 30 and light pipe 36 to provide the desired light color.

In one embodiment, the light emitted from the second LED 30 and light pipe 36 may be controlled (e.g., by a controller coupled to the connector device 44) to provide non-white light through the second lens section 28 that is in a normally-on state to provide the running light function for the vehicle, and that turns off and on to provide the turn signal function for the vehicle.

Figure 4:
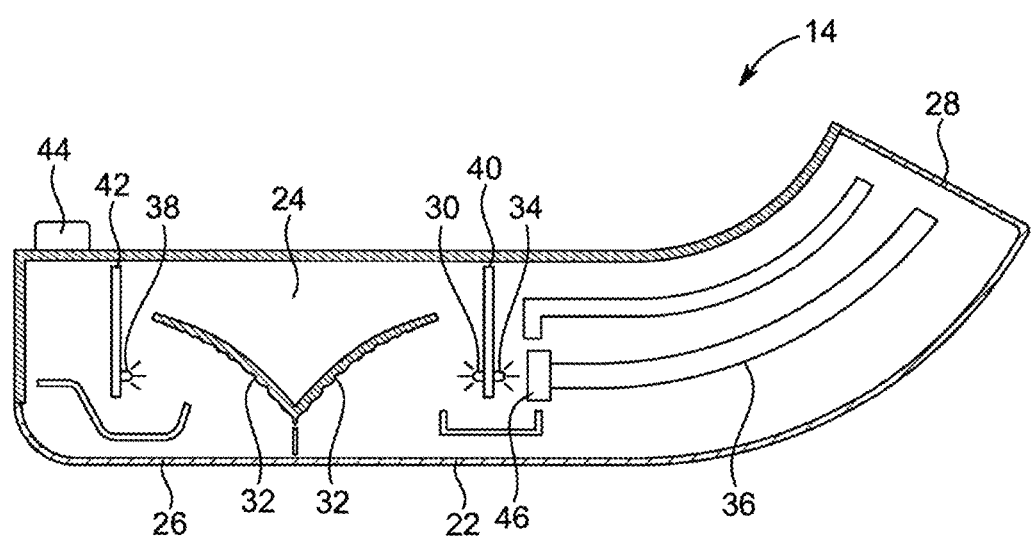
FIGS. 4-6 illustrate examples of the multi-functional light module with an optical filter to provide non-white light.

As shown in FIG. 4, the light module 14 may further includes an optical coupler 46 located adjacent the second LED 34 and configured to direct light from the second LED 34 into the light pipe 36. In order to provide a specified color for the side-facing light function, the optical coupler 46 may include or have an attached an optical filter (e.g., a colored lens) to modify the color of the second LED 34. For instance, in an embodiment, the second LED 34 and the first and third LEDs 30, 38 may all be white light LEDs, and a color filter 46 may be provided to modify the color of the light emitted by the second LED 34. For example, if the second LED 34 is utilized to provide a turn signal function, then an amber-colored lens 46 may be included to change white light emitted by the second LED 34 to amber light emitted from the light pipe 36 through the side-facing section 28 of the light module lens 22.

In embodiments, an optical filter (e.g., colored lens) may be welded or clipped to the light pipe 35. For example, FIG. 5 illustrates an embodiment with an optical filter 50 that is welded to the light pipe 36, and FIG. 6 another embodiment with an optical filter 60 that is clipped to the light pipe 36.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS

10 rearview mirror assembly
12 vehicle surface
14 light module
16 mirror head
18 mirror base
22 lens
24 housing
26 first lens section
28 second lens section
30 first LED
32 reflectors
34 second LED
36 light pipe
38 third LED
40 first PCB
42 second PCB
44 connector device
46 optical filter
50 welded optical filter
60 clipped optical filter It is claimed:

1. A light module for an exterior mirror of a vehicle, comprising:
   a housing;
   a lens attached to the housing and including at least a first lens section that is configured to direct light in a first direction and a second lens section that is configured to direct light in a second direction;
   a first light module printed circuit board (PCB) mounted within the housing;
   a first light emitting diode (LED) attached to the first light module PCB;
   at least one reflector mounted within the housing and configured to reflect light emitted from the first LED through the first lens section;
   a second LED attached to the first light module PCB;
   a light pipe mounted within the housing and configured to receive light emitted from the second LED and emit light through the second lens section;
   a second light module PCB mounted within the housing; and
   a third LED attached to the second light module PCB,
   wherein the at least one reflector is further configured to reflect light emitted from the third LED through the first lens section,
   wherein the light emitted through the first lens section is directed in a forward-facing direction with respect to a direction of forward movement of the vehicle, and
   wherein the first and third LEDs are configured to emit light in one or more directions different than the forward-facing direction, and the at least one reflector is configured to re-direct the light emitted from the first and third LEDs in the forward-facing direction.

2. The light module of claim 1, wherein light emitted through the first lens section is white light and light emitted through the second lens section is non-white light.

3. The light module of claim 2, wherein the first and second LEDs are white light emitting LEDs, and wherein white light emitted from the second LED is filtered to the provide the non-white light emitted through the second lens section.

4. The light module of claim 3, wherein the light emitted through the second lens section is amber light.

5. The light module of claim 4, wherein the light emitted through the second lens section is directed in a side- and/or rear-facing direction with respect to a direction of forward movement of the vehicle.

6. The light module of claim 5, wherein the light emitted through the second lens section provides a running light and/or turn signal function for the vehicle.

7. The light module of claim 6, wherein the light emitted through the second lens section is in a normally-on state to provide the running light function and turns off and on to provide the turn signal function for the vehicle.

8. The light module of claim 3, further comprising:
   an optical coupler configured to receive light from the second LED and direct light into the light pipe.

9. The light module of claim 8, wherein the optical coupler includes a filter that filters the spectrum of the white light emitted from the second LED to provide the non-white light emitted through the second lens section.

10. The light module of claim 9, wherein the optical coupler is welded or clipped to the light pipe.

11. The light module of claim 8, further comprising a filter attached to the optical coupler that filters the spectrum of the white light emitted from the second LED to provide the non-white light emitted through the second lens section.

12. The light module of claim 11, wherein the optical coupler and/or the filter is welded or clipped to the light pipe.

13. The light module of claim 3, wherein the light pipe filters the white light emitted from the second LED to provide the non-white light emitted through the second lens section.

14. A light module for an exterior mirror of a vehicle, comprising:
   a housing;
   a lens attached to the housing and including at least a first lens section that is configured to direct light in a first direction and a second lens section that is configured to direct light in a second direction;

a first light emitting diode (LED) mounted within the housing;

a second LED mounted within the housing;

a third LED mounted within the housing;

at least one reflector mounted within the housing and configured to reflect light emitted from the first LED and the third LED through the first lens section;

a light pipe mounted within the housing and configured to receive light emitted from the second LED and emit light through the second lens section, wherein light emitted through the first lens section is directed in a forward-facing direction with respect to a direction of forward movement of the vehicle, and wherein the first and third LEDs are configured to emit light in one or more directions different than the forward-facing direction, and the at least one reflector is configured to re-direct the light emitted from the first and third LEDs in the forward-facing direction.

15. The light module of claim 14, further comprising:
a first light module printed circuit board (PCB) mounted within the housing, wherein at least the first LED and second LED are attached to the first light module PCB.

16. The light module of claim 14, further comprising:
a second light module printed circuit board (PCB) mounted within the housing, wherein at least the third LED is attached to the second light module PCB.

17. The light module of claim 14, wherein light emitted through the first lens section is white light and light emitted through the second lens section is non-white light.

18. The light module of claim 17, wherein the first, second, and third LEDs are white light emitting LEDs, and wherein white light emitted from the second LED is filtered to the provide the non-white light emitted through the second lens section.

* * * * *